United States Patent
Miyashita et al.

(10) Patent No.: US 7,616,544 B2
(45) Date of Patent: Nov. 10, 2009

(54) ACCESS UNIT, ACCESS METHOD, COMPUTER-READABLE RECORDING MEDIUM RECORDED WITH ACCESS PROGRAM, AND CONTROL UNIT

(75) Inventors: Harumitsu Miyashita, Nara (JP); Yasumori Hino, Nara (JP); Tetsuya Shihara, Osaka (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 10/591,327

(22) PCT Filed: Oct. 21, 2005

(86) PCT No.: PCT/JP2005/019402

§ 371 (c)(1),
(2), (4) Date: Aug. 31, 2006

(87) PCT Pub. No.: WO2006/061955

PCT Pub. Date: Jun. 15, 2006

(65) Prior Publication Data

US 2007/0177468 A1    Aug. 2, 2007

(30) Foreign Application Priority Data

Dec. 7, 2004    (JP) .............................. 2004-354747

(51) Int. Cl.
*G11B 7/00*    (2006.01)
(52) U.S. Cl. .................................. 369/47.53
(58) Field of Classification Search .............. 369/30.11, 369/47.53; G11B 7/00, 27/36
See application file for complete search history.

(56) References Cited

U.S. PATENT DOCUMENTS

| | | | | |
|---|---|---|---|---|
| 6,480,448 B1 * | 11/2002 | Kawano et al. | ............. | 369/47.5 |
| 6,920,095 B2 * | 7/2005 | Morishima | ................ | 369/47.38 |
| 7,190,655 B2 * | 3/2007 | Kobayashi | .................. | 369/100 |
| 7,286,454 B2 * | 10/2007 | Lee | ........................... | 369/47.53 |
| 2002/0114244 A1 * | 8/2002 | Kelly et al. | ............... | 369/53.37 |
| 2003/0067998 A1 | 4/2003 | Nakajima et al. | | |
| 2005/0018572 A1 * | 1/2005 | Gushima et al. | ......... | 369/53.15 |
| 2005/0111281 A1 * | 5/2005 | Kato et al. | ................... | 365/222 |

FOREIGN PATENT DOCUMENTS

| | | |
|---|---|---|
| JP | 7-182792 | 7/1995 |
| JP | 7-311942 | 11/1995 |
| JP | 07311942 A * | 11/1995 |
| JP | 8-339541 | 12/1996 |
| JP | 2001-307327 | 11/2001 |
| JP | 2003-141823 | 5/2003 |

* cited by examiner

*Primary Examiner*—Peter Vincent Agustín
(74) *Attorney, Agent, or Firm*—Wenderoth, Lind & Ponack, L.L.P.

(57) ABSTRACT

An access unit, an access method, an access program and a control unit are provided. A record medium includes a user area for recording user data which can be recorded and regenerated based on an instruction given by a user. A recording-system circuit section included in the access unit records test data based on a predetermined test condition in the user area. A regeneration-system circuit section included in the access unit reads the test data recorded in the user area by the recording-system circuit section, and a system control circuit included in the access unit refers to the test data read by the regeneration-system circuit section and adjusts an access parameter for accessing the record medium.

13 Claims, 7 Drawing Sheets

ACCESS UNIT, ACCESS METHOD, COMPUTER-READABLE RECORDING MEDIUM RECORDED WITH ACCESS PROGRAM, AND CONTROL UNIT

BACKGROUND OF THE INVENTION

1. Field of the Invention

The present invention relates to an access unit which is capable of accessing a record medium including a user area so that a user can record data, and an access method, an access program and a control unit for the same purpose.

2. Description of the Related Art

In recent years, the density of a record medium has been heightened and its capacity has become larger. Hence, it has been increasingly important to make a record medium reliable. In order to secure the reliability of a record medium, there is a method in which an alternate sector with a defective sector is provided so that no access can be gained to the defective sector (e.g. refer to Patent Document 1). Besides, for the purpose of obtaining a record medium's reliability, a test processing for determining an optimum access parameter is executed in a recording-and-regenerating unit. Thereby, the access parameter is adjusted for the record medium.

The access parameter is, for example, the power of recording. The recording power is the power of a laser which irradiates the record medium when data is recorded. In the test processing for determining the optimum recording power the recording power at which the record medium is irradiated is adjusted.

The access parameter is adjusted based on the result of a test record and a test regeneration for a read-in area or a read-out area. The read-in area is allocated to an inner circumference of the record medium. The read-out area is allocated to an outer circumference of the record medium.

However, if the necessity of a test processing arises while data is recorded or regenerated by the access of an optical head to a user area, the test processing will take a longer time. This is because in the test processing, the optical head has to seek a read-in area or a read-out area, so that a test record and a test regeneration can be made for the read-in area or the read-out area.

If the test-processing time becomes longer, disadvantages may be raised, such as a disturbance in the regeneration of AV data, a break in the recording of a picture, and lengthening the time to execute the recording of user data.

In addition, if the density of a record medium becomes higher, this requires that data be recorded and regenerated using an access parameter which is most suitable for a change in recording-and-regeneration conditions. Hence, a test processing needs frequently executing according to a change in recording-and-regeneration conditions. As a result, the above described disadvantages become increasingly conspicuous.

Patent Document 1: Japanese Patent Laid-Open No. 7-182792 specification

DISCLOSURE OF THE INVENTION

In order to resolve the above described disadvantages, it is an object of the present invention to provide an access unit, an access method, an access program and a control unit which are capable of shortening the seek time of an optical head for a test record and a test regeneration.

An access unit according to the present invention which accesses a record medium, the record medium including a user area for recording user data which is recorded and regenerated based on an instruction given by a user, comprising: a recording section for recording test data based on a predetermined test condition in the user area; a reading section for reading the test data recorded in the user area by the recording section; and an adjusting section for referring to the test data read by the reading section, and adjusting an access parameter for accessing the record medium.

An access method according to the present invention for accessing a record medium, the record medium including a user area for recording user data which is recorded and regenerated based on an instruction given by a user, including: a recording step of recording test data based on a predetermined test condition in the user area; a reading step of reading the test data recorded in the user area in the recording step; and an adjusting step of referring to the test data read in the reading step, and adjusting an access parameter for accessing the record medium.

According to these configurations, the record medium includes a user area for recording user data which can be recorded and regenerated based on an instruction given by a user. Then, test data based on a predetermined test condition is recorded in the user area, and the test data recorded in the user area is read. Sequentially, by referring to the read test data, an access parameter for accessing the record medium is adjusted.

A computer-readable recording medium recorded with an access program according to the present invention for accessing a record medium, the record medium including a user area for recording user data which is recorded and regenerated based on an instruction given by a user, allowing, an access unit which includes a recording section for recording data in a record medium and a reading section for reading data from a record medium, to function as: a record instructing section for instructing the recording section to record test data based on a predetermined test condition in the user area; a read instructing section for instructing the reading section to read the test data recorded in the user area by the recording section; and an adjusting section for referring to the test data read by the reading section, and adjusting an access parameter for accessing the record medium.

A control unit according to the present invention which controls an access unit, the access unit including a recording section for recording data in a record medium and a reading section for reading data from a record medium, the record medium including a user area for recording user data which is recorded and regenerated based on an instruction given by a user, comprising: a record instructing section for instructing the recording section to record test data based on a predetermined test condition in the user area; a read instructing section for instructing the reading section to read the test data recorded in the user area by the recording section; and an adjusting section for referring to the test data read by the reading section, and adjusting an access parameter for accessing the record medium.

According to these configurations, the record medium includes a user area for recording user data which can be recorded and regenerated based on an instruction given by a user. Then, the recording section is instructed to record test data based on a predetermined test condition in the user area, and the reading section is instructed to read the test data recorded in the user area by the recording section. Sequentially, the read test data read by the reading section is referred to, and thereby, an access parameter for accessing the record medium is adjusted.

According to the present invention, the access parameter can be adjusted without recording and regenerating test data in a read-in area allocated to the inner-circumference side from a user area or a read-out area allocated to the outer-circumference side from the user area. This makes it possible to shorten the seek time of an optical head to record and regenerate the test data.

Moreover, in a record medium, its recording characteristics can vary according to the position in the radius directions. This is thought to be caused by the dispersion of the characteristics of a record film, the tilt of a disk, or the like. Therefore, a more suitable access parameter can be determined by making a test record and a test regeneration in an area closer to a user area where a record is made than the case where the same is done in a test area located at the innermost circumference or the outermost circumference of a disk. This helps improve a record quality.

The objects, characteristics and advantages of the present invention will be more obvious in the following detailed description and attached drawings.

DETAILED DESCRIPTION OF THE INVENTION

Hereinafter, an embodiment of the present invention will be described with reference to the attached drawings.

1. Record Medium

Figure 1:
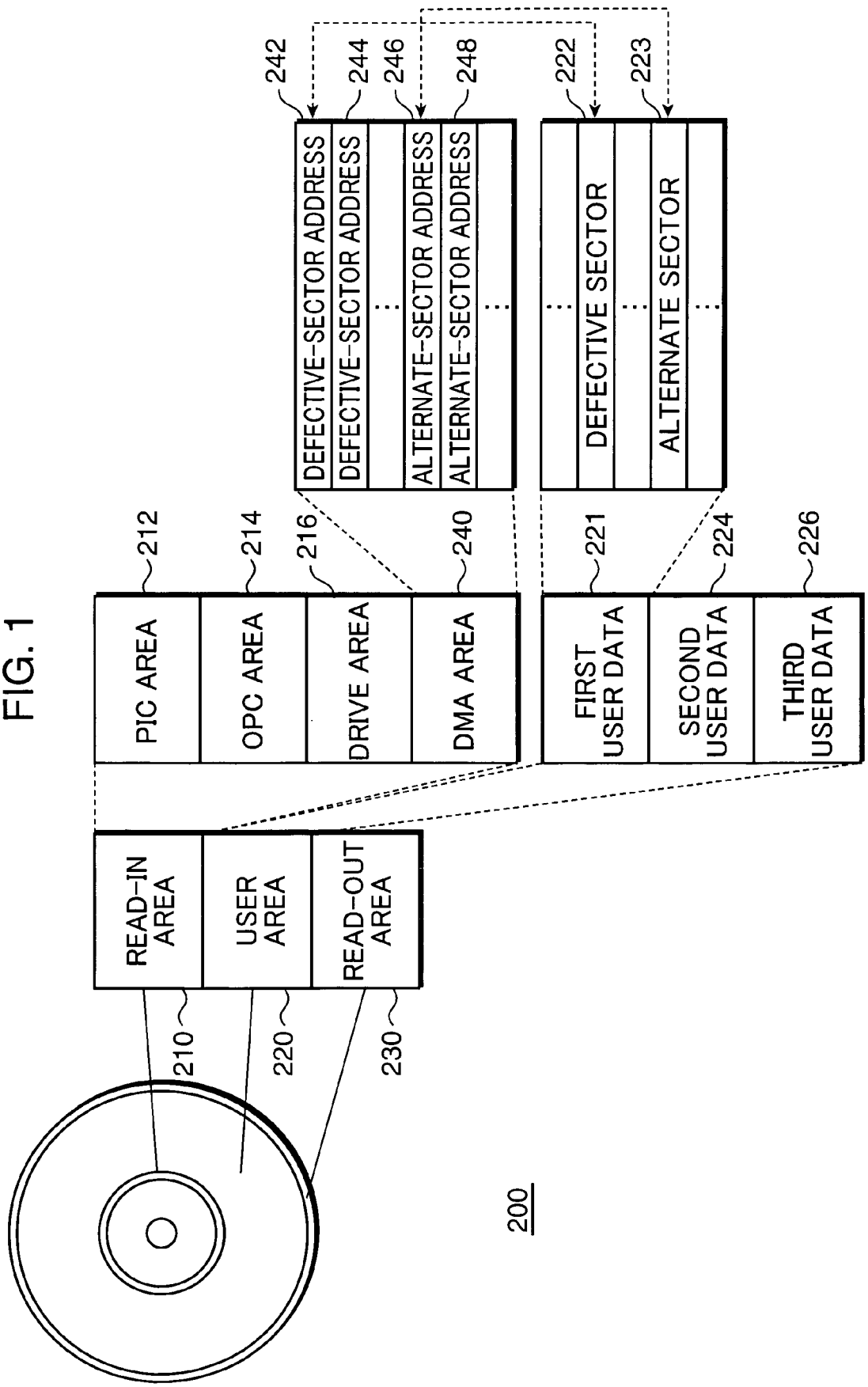
FIG. 1 is a representation, showing the structure of a record medium used in an embodiment of the present invention.

FIG. 1 shows the structure of a record medium 200 used in the embodiment of the present invention. The record medium 200 includes a record layer. A record mark is formed on the record layer, so that data is recorded in the record medium 200. In the record medium 200, tracks are formed concentrically and circularly.

The record medium 200 includes a read-in area 210, a user area 220 and a read-out area 230.

The user area 220 is designed so that a user can record data in it. In the user area 220, for example, user data is recorded which can be recorded and regenerated on the basis of an instruction given by the user. The user data includes, for example, audio data and visual data.

The user area 220 includes several pieces of user data. In the example of FIG. 1, the user area 220 includes first user data 221, second user data 224 and third user data 226.

The first user data 221 includes a defective sector 222 and an alternate sector 223. The defective sector 222 and the alternate sector 223 each include at least one sector. The defective sector 222 is a sector in which data cannot be normally recorded and regenerated because of a smudge adhering to the surface of the record medium 200 or a scratch on it. The alternate sector 223 is a sector for recording data to be recorded in the defective sector 222.

Incidentally, the defective sector 222 is not limited to a sector in which data cannot be normally recorded and regenerated. The defective sector 222 can be a sector in which data cannot seemingly be normally recorded and regenerated. Even in this case, the data which should be recorded in the defective sector 222 is recorded in the alternate sector 223.

Different from the user area 220, the read-in area 210 and the read-out area 230 are not designed so that a user can record data in them. In the read-in area 210 and the read-out area 230, information for managing the user area 220 or data for managing defects in the user area 220 is recorded which is necessary for a unit which gains access to the record medium 200.

The read-in area 210 includes a PIC (or permanent information and control data) area 212, an OPC (or optimum power calibration) area 214, a drive area 216, and a DMA (or defect management area) area 240.

For example, the maximum address and access parameter of the user area 220 are stored in the PIC area 212. The access parameter is, for example, a parameter on laser power for forming and erasing a plurality of record marks in the record medium 200, and a parameter on the width of a recording pulse for recording the plurality of record marks.

The OPC area 214 is an area for recording or regenerating test data. The recording or regeneration of the test data is made for the purpose of an access unit which has access to the record medium 200 adjusting the access parameter (e.g. adjusting the recording power and the pulse width).

In the DMA area 240, a list is stored which shows information on the position of a defective area (e.g. the defective sector 222) and information on the position of an alternate area (e.g. the alternate sector 223) with the defective area. For example, defective-sector addresses 242, 244 and alternate-sector addresses 246, 248 are stored in the DMA area 240. The defective-sector address 242 indicates, for example, the position of the defective sector 222. The alternate-sector address 246 indicates, for example, the position of the alternate sector 223.

So far, an example of the record medium 200 used in the embodiment of the present invention has been described by referring to FIG. 1. For example, in the example shown in FIG. 1, the user area 220 corresponds to "a user area for recording user data which is recorded and regenerated based on an instruction given by a user". However, the record medium 200 used in the embodiment of the present invention is not limited to the example shown in FIG. 1. A record medium can have any structure, as long as it includes such a user area for recording user data which can be recorded and regenerated based on an instruction given by a user.

For example, tracks are formed concentrically and circularly in the record medium 200, but the shape of each track is not limited to a concentric circle, so long as the record medium 200 includes the user area 220. In the record medium 200, tracks may also be spirally formed.

Furthermore, the record medium 200 includes the OPC area 214. However, the record medium 200 may not necessarily include the OPC area 214, as long as the record medium 200 includes the user area 220.

Moreover, the record medium 200 is a rewritable record medium or a writing-once record medium. The rewritable record medium is, for example, a CD-RW, a DVD-RW (or digital versatile disk rewritable), a BDRE (or Blu-ray disk rewritable format), or the like. The writing-once record medium is, for example, a CD-R, a DVD-R, a BD-R, or the like.

In addition, the record medium 200 is, for example, an optical disk. However, the record medium 200 is not limited to an optical disk, so long as the record medium 200 includes the user area 220. For example, the record medium 200 may also be a magnetic disk which includes the user area 220.

2. Access Unit

Figure 2:
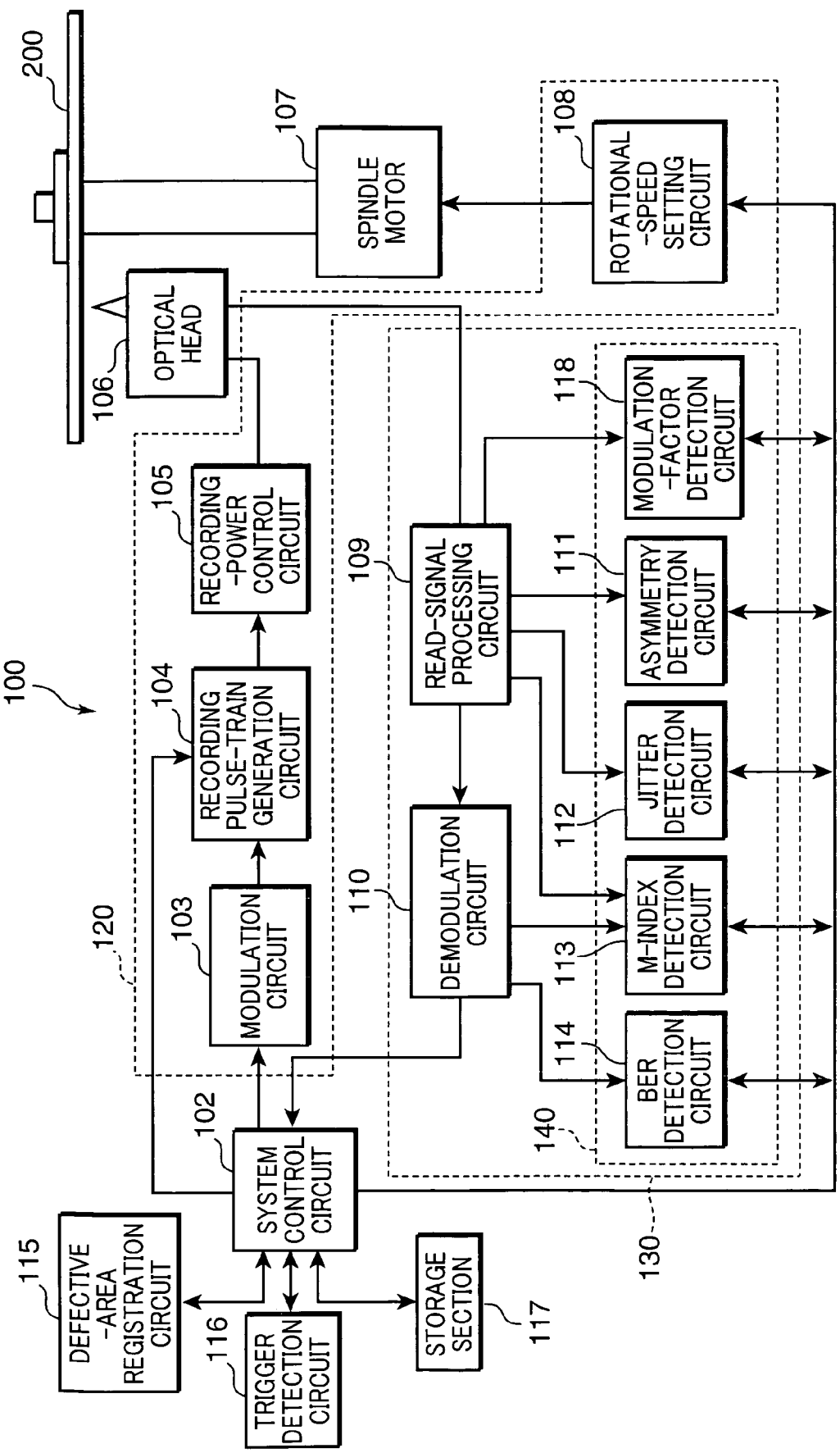
FIG. 2 is a block diagram, showing the configuration of an access unit according to the embodiment of the present invention.

FIG. 2 is a block diagram, showing the configuration of an access unit 100 according to the embodiment of the present invention. The access unit 100 is configured so that the record medium 200 shown in FIG. 1 can be attached to it.

The access unit 100 includes: a system control circuit 102 which controls the operation of each component element provided in the access unit 100; an optical head 106; a spindle motor 107 which rotates the record medium 200; a defective-area registration circuit 115; a trigger detection circuit 116; a storage section 117; a recording-system circuit section 120; and a regeneration-system circuit section 130.

The optical head 106 reads data which is recorded in the record medium 200. Specifically, the optical head 106 concentrates a beam of light from a semi-conductor laser and irradiates the record medium 200 with the beam of light which it has concentrated. Then, the optical head 106 detects a beam of light which is reflected by the record medium 200 to read the data recorded in the record medium 200. Besides, the optical head 106 records data in the record medium 200. Specifically, the optical head 106 concentrates a beam of light from the semi-conductor laser and irradiates the record medium 200 with the beam of light which it has concentrated. Thereby, it records the data in the record medium 200.

According to an instruction given by the system control circuit 102, the defective-area registration circuit 115 registers, in the DMA area 240, the defective-sector address 242 which is included in the user area 220. Besides, according to an instruction given by the system control circuit 102, the defective-area registration circuit 115 allocates, to the first user data 221, the alternate sector 223 for recording data to be recorded in the defective sector 222. Then, it registers the alternate-sector address 246 in the DMA area 240. For example, when the access unit 100 comes into operation, the access unit 100 reads the defective-sector addresses and the alternate-sector addresses which are registered in the DMA area 240 of the record medium 200. Thereby, it recognizes the position of the defective sector 222 and the position of the alternate sector 223.

The trigger detection circuit 116 detects a trigger for beginning to adjust an access parameter. The trigger detection circuit 116 will be described in detail later.

The storage section 117 stores data which is recorded in the user area 220. Data is recorded in the user area 220 according to an instruction given by the system control circuit 102. Data to be stored in the storage section 117 is, for example, user data which represents contents. The user data is, for example, at least one of audio data and visual data. Incidentally, the data which is stored in the storage section 117 is not limited to the user data. It may also be mark data which corresponds to a specific pattern record mark, as long as it can be recorded in the user area 220. For example, it may also be at least one of mark data which corresponds to the shortest record mark (i.e., 2T mark data which corresponds to a 2T record mark) and mark data which corresponds to the longest record mark (i.e., 9T mark data which corresponds to a 9T record mark).

The recording-system circuit section 120 refers to a read signal, and thereby, adjusts a recording parameter for making a record in the record medium 200. According to an instruction given by the system control circuit 102 in response to the detection of a trigger, the recording-system circuit section 120 records, in the user area 220, data which is stored in the storage section 117.

The recording-system circuit section 120 includes a modulation circuit 103, a recording pulse-train generation circuit 104, a recording-power control circuit 105, and a rotational-speed setting circuit 108.

The modulation circuit 103 converts data which is recorded in the record medium 200 into a binary recording modulation code. The recording pulse-train generation circuit 104 generates data indicating a recording pulse train on the basis of the recording modulation code. Based on the generated data, the recording-power control circuit 105 regulates the semi-conductor laser's electric current. The rotational-speed setting circuit 108 controls the number of revolutions in the spindle motor 107 so that the rotational speed of the record medium 200 can be set.

The regeneration-system circuit section 130 refers to a read signal, and thereby, adjusts a regeneration parameter for regenerating data which is recorded in the record medium 200. In response to the detection of a trigger, the regeneration-system circuit section 130 executes a test regeneration of data which is recorded in the user area 220.

The regeneration-system circuit section 130 includes a read-signal processing circuit 109, a demodulation circuit 110, and a detection circuit section 140.

The read-signal processing circuit 109 processes a signal (i.e., a signal recorded in a part of the user area) read by the optical head 106. The read-signal processing includes a processing for digitizing the read signal and converting it into a binary, and a processing for obtaining a synchronous clock for the read signal. The demodulation circuit 110 decodes the digitized read signal and generates a read signal subjected to the decoding.

On the basis of the read signal or the decoded read signal, the detection circuit section 140 detects the record state of the data recorded in the user area 220 and decides whether the recorded-data record state is good or not. The detection circuit section 140 includes an asymmetry detection circuit 111, a jitter detection circuit 112, an M-index detection circuit 113, a bit error-rate (or BER) detection circuit 114, and a modulation-factor detection circuit 118.

The asymmetry detection circuit 111 detects the asymmetry value of the read signal. The jitter detection circuit 112 detects the jitter value of the read signal. The M-index detection circuit 113 detects the M-index of the decoded read signal. The BER detection circuit 114 detects the bit error rate of the decoded read signal. The modulation-factor detection circuit 118 detects the modulation factor of the read signal. The asymmetry value, jitter value, M-index, bit error rate and modulation factor indicate the record state of the data recorded in the user area 220.

So long as it can detect the record state of the recorded data, the detection circuit section 140 may not necessarily include the asymmetry detection circuit 111, the jitter detection circuit 112, the M-index detection circuit 113, the bit error-rate (or BER) detection circuit 114, and the modulation-factor detection circuit 118. For example, the detection circuit section 140 can also include at least one of the asymmetry detection circuit 111, the jitter detection circuit 112, the M-index detection circuit 113, the BER detection circuit 114, and the modulation-factor detection circuit 118. In addition, for example, the detection circuit section 140 may also include a detection circuit except for the asymmetry detection circuit 111, the jitter detection circuit 112, the M-index detection circuit 113, the BER detection circuit 114, and the modulation-factor detection circuit 118.

As described with reference to FIG. 1 and FIG. 2, in the access unit according to the present invention, data (e.g. data indicating contents and data represented by a specific-pattern record mark) recorded in the user area 220 is referred to, so that the access parameter is adjusted. Therefore, the access parameter can be adjusted without referring to data recorded in a read-in area allocated to the inner-circumference side from a user area or a read-out area allocated to the outer-circumference side from the user area. As a result, the time to gain access to an area in which reference data is recorded becomes shorter, thus shortening the time taken for a test record and a test regeneration.

So far, an example of the access unit according to the embodiment of the present invention has been described by referring to FIG. 1 and FIG. 2. For example, in the example shown in FIG. 2, the system control circuit 102 and the recording-system circuit section 120 correspond to the recording section; the system control circuit 102 and the regeneration-system circuit section 130, to the reading section; and the system control circuit 102, to the adjusting section. However, the access unit 100 according to the present invention is not limited to the example shown in FIG. 2. Any configuration can be applied, as long as a plurality of component elements provided in an access unit include the above described functions.

For example, an access parameter can be detected in a test record and a test regeneration. Such an access parameter which can be detected in a test record and a test regeneration includes the power of recording and the width of a pulse.

For example, an access parameter can be detected in a test regeneration alone. Such an access parameter which can be detected in a test regeneration alone includes a servo parameter (e.g. a focus balance, a spherical aberration and the tilt of a record medium). Besides, if necessary, even the power of recording and the width of a pulse can be detected in a test regeneration alone.

For example, at least one of the system control circuit 102, the recording-system circuit section 120 and the regeneration-system circuit section 130 can be included in a single-chip LSI. If at least one of the system control circuit 102, the recording-system circuit section 120 and the regeneration-system circuit section 130 is included in such an LSI, the process of manufacturing the access unit 100 becomes easier. This LSI functions as the control unit according to the present invention.

Furthermore, the access unit 100 may also include a communicating section. Such a communicating section is connected to a host PC (or personal computer). Via the communicating section, the access unit 100 may also transmit and receive data to and from the host PC, or receive a command from it. Such a command is, for example, a write command.

Moreover, in order to adjust the power of recording to an optimum value, the system control circuit 102 operates the asymmetry detection circuit 111. The system control circuit 102 operates the jitter detection circuit 112, so that the jitter value of a recording-and-regeneration signal approximates its minimum. However, the detection circuit which the system control circuit 102 operates is not limited to at least one of the asymmetry detection circuit 111 and the jitter detection circuit 112. The detection circuit which the system control circuit 102 operates may also be at least one of the M-index detection circuit 113, the BER detection circuit 114 and the modulation-factor detection circuit 118. For example, in order to adjust the power of recording to an optimum value, the system control circuit 102 operates the M-index detection circuit 113, the system control circuit 102 operates the BER detection circuit 114, or the system control circuit 102 operates the modulation-factor detection circuit 118.

Incidentally, the M-index indicates the reliability of a maximum-likelihood decoding result in a PRML (or partial response maximum likelihood) system. The index which indicates the reliability of a maximum-likelihood decoding result in the PRML system is described in detail in Japanese Patent Laid-Open No. 2003-141823 specification filed by the inventors identical in part with the inventors of the present application and the applicant identical with the applicant of the present application. Japanese Patent Laid-Open No. 2003-141823 specification proposes the method of controlling and determining the power of a laser beam by referring to a signal evaluation index based on a PRML expected-value error. The PRML system is a combination of a waveform equalization system corresponding to PR and a maximum-likelihood encoding system corresponding to ML.

3. Access Method

Figure 3:
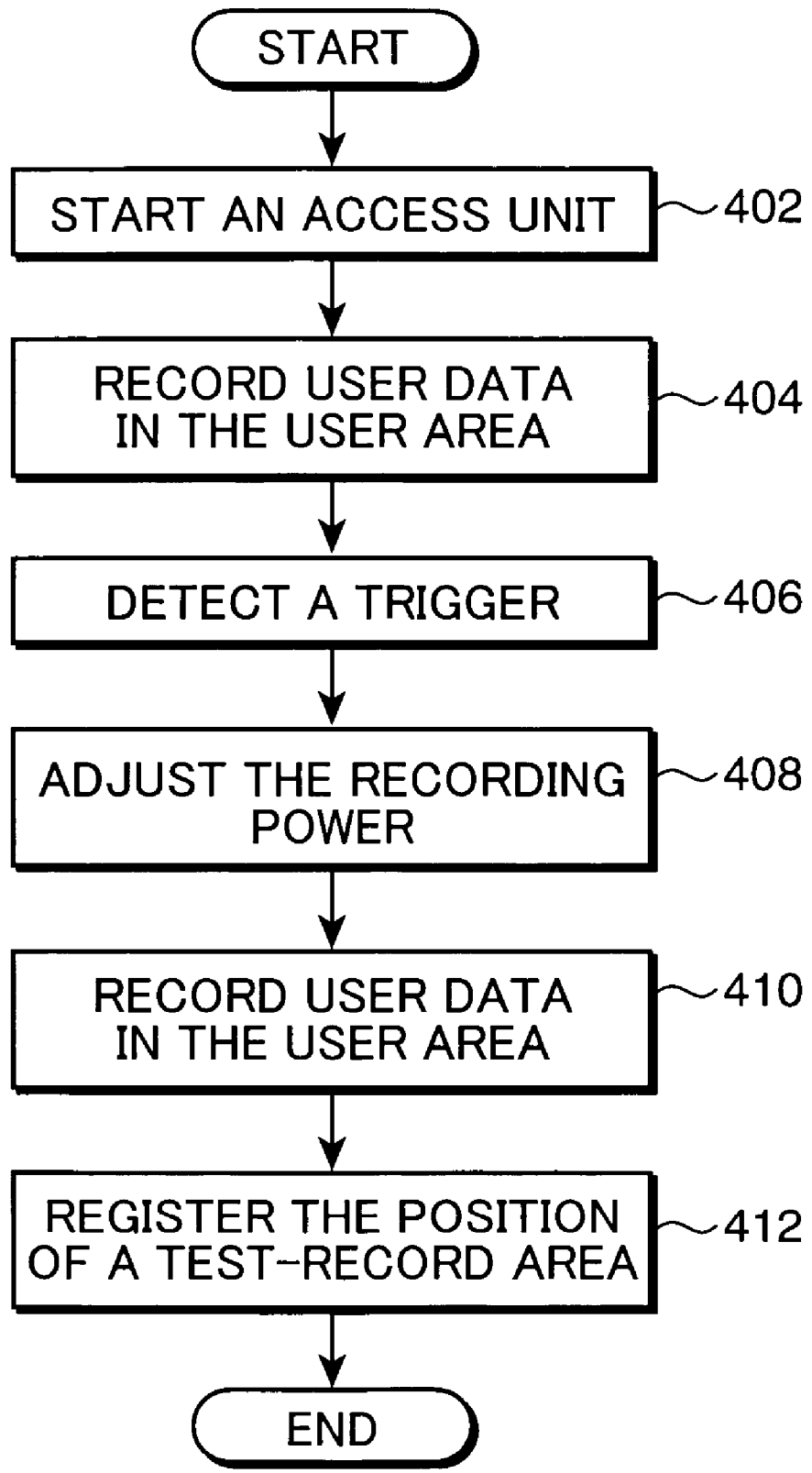
FIG. 3 is a flow chart, showing an example of the procedure for an access processing according to the embodiment of the present invention.

FIG. 3 is a flow chart, showing an example of the procedure for an access processing according to the embodiment of the present invention. Hereinafter, with reference to FIG. 1, FIG. 2 and FIG. 3, the access-processing procedure according to the embodiment of the present invention will be described step by step.

Step 402: The access unit 100 starts to be operated by a user's manipulation. The defective-sector address 242 and the alternate-sector address 246 registered in the DMA area 240 of the record medium 200 are read, and the position of the defective sector 222 and the position of the alternate sector 223 are recognized.

Step 404: The system control circuit 102 controls the recording-system circuit section 120 so that it records user data in the user area 220 of the record medium 200.

Step 406: The trigger detection circuit 116 detects a trigger for beginning to adjust the power of recording. Specifically, the trigger detection circuit 116 detects the trigger based on a change in the temperature of the access unit 100. The trigger detection circuit 116 includes a thermometer which can measure the temperature of the access unit 100. In the trigger detection circuit 116, the temperature at the time when the access unit 100 comes into operation is stored. The trigger detection circuit 116 measures the temperature of the access unit 100 at predetermined timing. Then, it detects the difference between the temperature which it has detected and the temperature at the start time exceeding a predetermined value. Herein, the variation in temperature is, for example, 4, 8 and 16 degrees. After the trigger is detected, the processing goes to a step 408.

Step 408: The system control circuit 102 adjusts the recording power, on the basis of the detection of the trigger by the trigger detection circuit 116. Specifically, if the trigger is detected by the trigger detection circuit 116, the system control circuit 102 instructs the recording-system circuit section 120 to record the user data as test data in the record medium 200.

According to the instruction given by the system control circuit 102, the recording-system circuit section 120 makes a test record of the user data stored in the storage section 117 in the user area 220. The test-record position of the user data is adjacent to the record position of the user data recorded when the trigger is detected.

Next, if the test record is completed by the recording-system circuit section 120, the system control circuit 102 instructs the regeneration-system circuit section 130 to regenerate the test-recorded user data from the record medium 200. According to the instruction given by the system control circuit 102, the regeneration-system circuit section 130 executes a test regeneration of the test-recorded user data. The system control circuit 102 refers to the user data stored in the storage section 117 and the user data read from the test-record position. Thereby, it adjusts the recording power. The adjustment of the recording power will be described in detail later.

Step 410: On the basis of the recording power which it has adjusted, the system control circuit 102 continues to record the user data. At this time, the user data is recorded from a position adjacent to the test-record position. In this way, the user data is recorded closely and continuously to the test-record position, thus helping use the user area 220 effectively.

Step 412: The test-record area in which the test record of the user data has been made is regarded as a defective area. Then, the position of the test-record area is registered in the DMA area 240 by the defective-area registration circuit 115. The registration of such a defect is executed at the time when the access unit 100 receives an instruction to turn off the power. Specifically, the system control circuit 102 decides whether or not it has received the power-off instruction. Herein, if the power-off instruction has not been received, the address of the test-record area is stored in a RAM. Then, the processing returns to the step 404.

If the power-off instruction has been received, the defective-area registration circuit 115 reads the address of the test-record area stored in the RAM. Then, it records this address in the DMA area 240 of the record medium 200. In this way, without registering a defective area in the DMA area 240 every time a test record is made, the timing in registering the defective area is limited to when the access unit 100's power is turned off. This helps reduce the number of times at which the optical head 106 seeks. After the defective area is registered, the processing comes to an end.

In the access processing according to the present invention, a trigger for starting to adjust the power of recording is detected (refer to the step 406). This makes it possible to detect a change in the condition where data is recorded and regenerated. Thereby, the timing when the recording power should be adjusted can be detected.

Furthermore, in the access processing according to the present invention, the position where a test record is made of the user data is adjacent to the record position of the user data recorded when the trigger is detected (refer to the step 408). Therefore, the time for an optical head to seek becomes shorter than that of the prior art according to which a test record is made in a read-in area or a read-out area which is far away from the area in which the user data is currently recorded. If the record medium 200 is, for example, a DVD-R, then a test record of test data can be made in an area where the user data is not yet recorded which is adjacent to a record-completion area where it is already recorded. This makes it possible to shorten an optical head's seek time. Or, if the record medium 200 is, for example, a DVD-RW, then a test record of test data can be made in an area (regardless of an area where the user data is already recorded or an area where it is not yet recorded) adjacent to the area in which the user data is now recorded. This helps shorten the time when an optical head should seek.

Moreover, in the access processing according to the present invention, the position where a test record is made of the user data is adjacent to the record position of the user data recorded when the trigger is detected (refer to the step 408). Hence, test data is recorded in an area close to the area in which the user data is currently recorded. Therefore, a test record can be made in an area which has substantially the same characteristics of a record medium. Thereby, the power of recording can be more suitably adjusted, thus making a record quality higher.

In addition, in the access processing according to the present invention, a test-record area in which a test record is made of the user data is considered to be a defective area. Then, the position of the test-record area is registered in the DMA area 240 by the defective-area registration circuit 115 (refer to the step 412). Therefore, even if a test record causes a defect in the test-record area, access can be prevented from being given to this area after registered.

Figure 4:
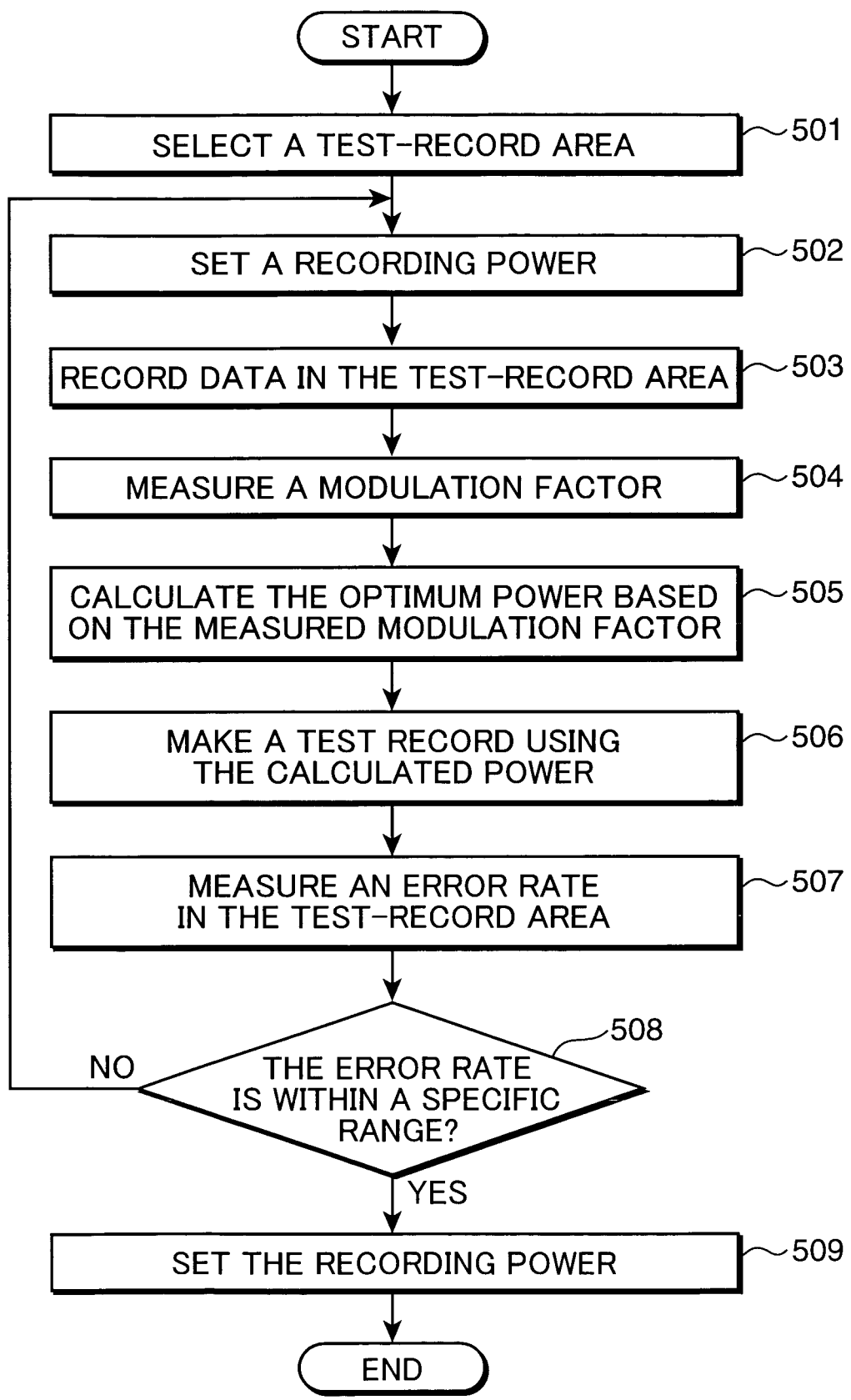
FIG. 4 is a flow chart, showing the procedure for adjusting the power of recording.

Next, the power of recording in the step 408 of FIG. 3 will be described. FIG. 4 is a flow chart, showing the procedure for adjusting the recording power. Hereinafter, the recording-power adjustment procedure will be described step by step with reference to FIG. 4.

Step 501: The system control circuit 102 selects a test-record area. The test-record area is adjacent to the record position of the user data recorded at the time when a trigger is detected.

Step 502: The system control circuit 102 sets the power of recording for a test record.

Step 503: The system control circuit 102 instructs the recording-system circuit section 120 to record test data in the test-record area. The recording-system circuit section 120 records the test data in the test-record area. For example, if a plurality of recording powers are set, the test-record area is divided into a plurality of areas. Then, the test data is recorded in each area, using a different recording power. Incidentally, the user data stored in the storage section 117 is used as the test data.

Step 504: The system control circuit 102 instructs the regeneration-system circuit section 130 to regenerate the test data recorded in the test-record area. According to the instruction given by the system control circuit 102, the regeneration-system circuit section 130 executes a test regeneration of the test-recorded user data (i.e. the test data). At this time, the modulation-factor detection circuit 118 measures the modulation factor of a regeneration signal. The modulation factor is a value which indicates the amplitude of the regeneration signal.

Step 505: Based on the modulation factor measured by the modulation-factor detection circuit 118, the system control circuit 102 calculates the optimum recording power.

Step 506: The system control circuit 102 sets the recording power which it has calculated. Then, the system control circuit 102 instructs the recording-system circuit section 120 to record the test data in the test-record area. The recording-system circuit section 120 records the test data in the test-record area, using the set recording power.

Step 507: The system control circuit 102 instructs the regeneration-system circuit section 130 to regenerate the test data recorded in the test-record area. According to the instruction given by the system control circuit 102, the regeneration-system circuit section 130 executes a test regeneration of the test-recorded user data (i.e. the test data). At this time, the BER detection circuit 114 measures an error rate in the test-record area.

Step 508: The system control circuit 102 decides whether or not the error rate measured by the BER detection circuit 114 is within a specific range.

If the decision is made that the error rate is within the specific range (YES at the step 508), the processing goes to a step 509. On the other hand, if the decision is made that the error rate is not within the specific range (NO at the step 508), the processing returns to the step 502. Then, the operation of the step 502 to the step 508 is repeatedly executed.

Step 509: The system control circuit 102 sets the recording power after adjusted. Then, the processing is completed after the adjusted recording power has been set.

So far, the access-processing procedure according to the embodiment of the present invention has been described with reference to FIG. 1, FIG. 2, FIG. 3 and FIG. 4.

For example, in the example described by referring to in FIG. 4, the step 502 and the step 503 correspond to the recording step; the step 504, to the reading step; and the step 505 and the step 509, to the adjusting step. However, the access-processing procedure according to the present invention is not limited to the procedure shown in FIG. 3. Any procedural method can be included within the scope of the present invention, as long as each such procedure as described above is executed.

For example, there is no need to execute the step 506 to the step 508. User data may also be directly recorded in the user area, and at least one of its asymmetry value, jitter value, M-index, bit error rate and modulation factor may also be measured. Besides, if an access parameter after adjusted is within a desirable range from an access parameter before adjusted, the access parameter after adjusted may also be used as the access parameter. In addition, if the user area is a defective area, or if there is some doubt about the precision of a read signal because the servo or the like has jumped, then the read signal may not be adopted.

For example, the detection of a trigger (refer to the step 406) is executed while user data is recorded, but its timing is not limited to this. It may also be executed while user data is regenerated. Besides, after the regeneration, the trigger detection circuit 116 may also detect a trigger based on the issuance of a write command.

In the access unit according to the present invention, a trigger is detected on the basis of a change in the temperature of the access unit. However, it is not limited to this, so long as the trigger detection circuit 116 can detect the timing in adjusting the access parameter. For example, the trigger detection circuit 116 may also detect a trigger based on the record position of data. In addition, the trigger detection circuit 116 may also detect a trigger based on the timing when a host PC issues a write command. Furthermore, the trigger detection circuit 116 may also detect a trigger based on the operating time of the access unit 100. Herein, the operating time is, for example, 10 to 15 minutes. The trigger detection circuit 116 detects a trigger at intervals of a predetermined operating time.

Moreover, the trigger detection circuit 116 may also detect a trigger, for example, in the case where some tracks of the record medium 200 are disconnected because of a scratch, a fingerprint or the like left on the surface of the record medium 200. In this case, the system control circuit 102 allows the optical head 106 to skip from the record-end position of user data to the position several tracks away from there on the outer-circumference side. Then, the recording-system circuit section 120 records test data in the test-record area for adjusting the access parameter. The recording-system circuit section 120 records user data consecutively from the record-end position of the test data. The defective-area registration circuit 115 registers, as a defective area, the range from the record-end position of the user data to the record-end position of the test data. At this time, the recording-system circuit section 120 may also record the user data continuously from the position several tracks away from the test data's record-end position on the outer-circumference side.

In addition, the adjustment of the access parameter is not limited to the adjustment of the recording power. The access-parameter adjustment may also be the adjustment of a specific pattern record mark. Besides, the access-parameter adjustment may also be the adjustment of a focus balance which indicates the converging state of an optical beam spot.

Furthermore, the timing in registering a defective area is not limited to when the access unit 100 receives an instruction to turn off the power. It may also be the time when the access unit 100 comes into a sleep state, or the time when the access unit 100 finishes executing a writing operation. Hence, limitations are put on the defective-area registration timing, thus helping reduce the number of times at which an optical head seeks.

Moreover, the data whose test record is made in the user area is not limited to user data. For example, it may also be mark data which corresponds to a specific pattern record mark. The specific pattern record mark includes at least one of a 2T record mark which is the shortest record mark, a 9T record mark which is the longest record mark and a 3T record mark to an 8T record mark. Besides, the specific pattern record mark may also be, for example, a repetitive single pattern of the 8T record mark and a space. Incidentally, after the specific pattern record mark is recorded in the user area, user data is overwritten in this area. Thereafter, the corresponding area can be registered as a defective area.

In addition, without making a test record, the system control circuit 102 can adjust the access parameter only by a test regeneration. For example, the system control circuit 102 adjusts the access parameter by referring to mark data which is stored in the storage section 117 and data which is read.

Furthermore, the system control circuit 102 may also create a table which indicates an access parameter optimized by an adjustment. Before the access unit 100's operation is brought to an end, the system control circuit 102 creates a table and stores this table in the storage section 117 of the access unit 100. In this case, when the access unit 100 is started again, there is no need for the system control circuit 102 to adjust the access parameter afresh. All that the system control circuit 102 has to do is to refer to the table stored in the storage section 117 of the access unit 100. Thereby, the most suitable access parameter can be obtained.

Moreover, the present invention is not limited to the fact that the position where user data is recorded following a recording-power adjustment should be adjacent to the test-record position. A test record supposed to change the recording power may make the servo unstable and destroy the user-data area. Thus, the user-data record position may also be apart from the test-record position. For example, user data is recorded in a place several tracks away from the test-record position.

In addition, the present invention is not limited to the fact that the test-record position should be adjacent to the record position of the user data recorded when a trigger is detected. The test-record position may also be a predetermined area apart from the record position of the user data recorded at the time of the trigger detection. Therefore, even if the change in the recording power at the test-record time gives the servo-mechanism some trouble, which causes a shift in the test-data record position, then the user data recorded at the time of the trigger detection can be prevented from being destroyed.

For example, if the record medium 200 is a DVD-R, test data is recorded in a position several tracks away on the outer-circumference side from the record position of the user data recorded at the time of the trigger detection. This is because in a writing-once record medium, user data is recorded from the inner circumference toward the outer circumference of the record medium. For example, if the record medium 200 is a DVD-RW, then test data is recorded, by deciding whether the record position is an overwriting area or a defect registration area, near the area where the user data is recorded as well as several tracks away from this area so that the user data will not be destroyed even though the servo-mechanism has trouble.

Figure 5A:
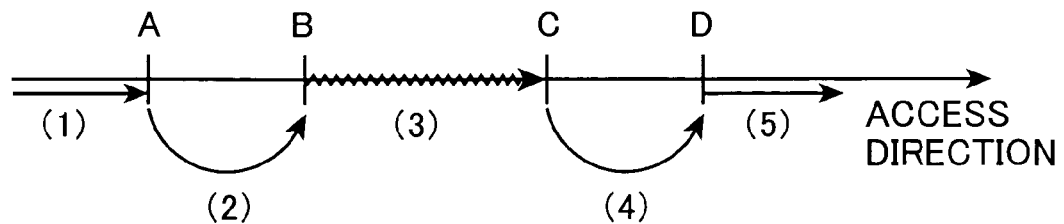
FIG. 5 is an illustration, showing various examples of the order of access.

FIG. 5 is an illustration, showing various examples of the order of access. Hereinafter, with reference to FIG. 5, an example will be described in which the position where a test record is made is a predetermined distance apart from the record position of user data recorded when a trigger is detected. FIG. 5A is an illustration, showing an example of the access order.

The access unit 100 gains access to the record medium 200 along a predetermined direction. Herein, the predetermined direction is a direction from the inner-circumference side toward the outer-circumference side of the record medium 200. This is the direction in which the optical head 106 moves.

The recording-system circuit section 120 of the access unit 100 records user data in the record medium 200 (an arrow (1)). Then, the trigger detection circuit 116 detects a trigger at a point A. After the trigger is detected, the system control circuit 102 allows the optical head 106 to skip to a point B several tracks away from the point A on the outer-circumference side (an arrow (2)). Next, the recording-system circuit section 120 records test data in a test-record area (an area from the point B to a point C) for adjusting the access parameter (an arrow (3)). After the test record is completed, the system control circuit 102 allows the optical head 106 to skip to a point D several tracks away from the point C on the outer-circumference side (an arrow (4)). Then, the recording-system circuit section 120 records user data sequentially (an arrow (5)). Incidentally, the defective-area registration circuit 115 registers the area from the point A to the point B as a defective area.

Figure 5B:
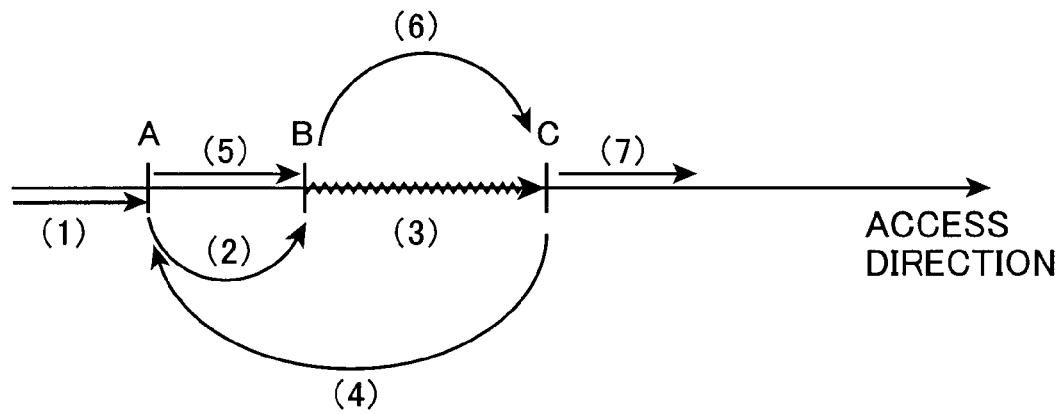

FIG. 5B is an illustration, showing another example of the access order. The access unit 100 gains access to the record medium 200 along a predetermined direction. The record medium 200 is, for example, a DVD-R or a DVD-RW.

The recording-system circuit section 120 of the access unit 100 records user data in the record medium 200 (an arrow (1)). Then, the trigger detection circuit 116 detects a trigger at a point A. After the trigger is detected, the system control circuit 102 allows the optical head 106 to skip to a point B several tracks away from the point A on the outer-circumference side (an arrow (2)). Next, the recording-system circuit section 120 records test data in a test-record area (an area from the point B to a point C) for adjusting the access parameter (an arrow (3)). After the test record is completed, the system control circuit 102 allows the optical head 106 to skip from the point C to the point A (an arrow (4)). Then, the recording-system circuit section 120 records user data sequentially from the point A to the point B (an arrow (5)). The system control circuit 102 allows the optical head 106 to skip from the point B to the point C (an arrow (6)). Then, the recording-system circuit section 120 records user data continuously from the point C (an arrow (7)). Incidentally, the defective-area registration circuit 115 registers the area from the point B to the point C as a defective area. Thereby, the system control circuit 102 recognizes the area from the point B to the point C as a defective area.

Figure 5C:
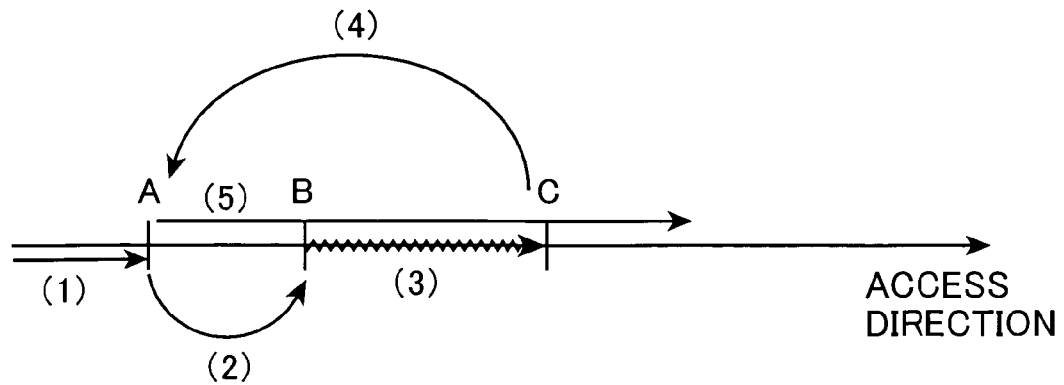

FIG. 5C is an illustration, showing another example of the access order. The access unit 100 gains access to the record medium 200 along a predetermined direction. The record medium 200 is, for example, a DVD-RW.

The recording-system circuit section 120 of the access unit 100 records user data in the record medium 200 (an arrow (1)). Then, the trigger detection circuit 116 detects a trigger at a point A. After the trigger is detected, the system control circuit 102 allows the optical head 106 to skip to a point B several tracks away from the point A on the outer-circumference side (an arrow (2)). Next, the recording-system circuit section 120 records test data in a test-record area (an area from the point B to a point C) for adjusting the access parameter (an arrow (3)). After the test record is completed, the system control circuit 102 allows the optical head 106 to skip from the point C to the point A (an arrow (4)). Then, the recording-system circuit section 120 records user data sequentially from the point A (an arrow (5)). Incidentally, the record medium 200 is the DVD-RW. Hence, there is no need for the defective-area registration circuit 115 to register the area from the point B to the point C as a defective area. In this case, user data is overwritten in the test-record area from the point B to the point C.

Figure 6:
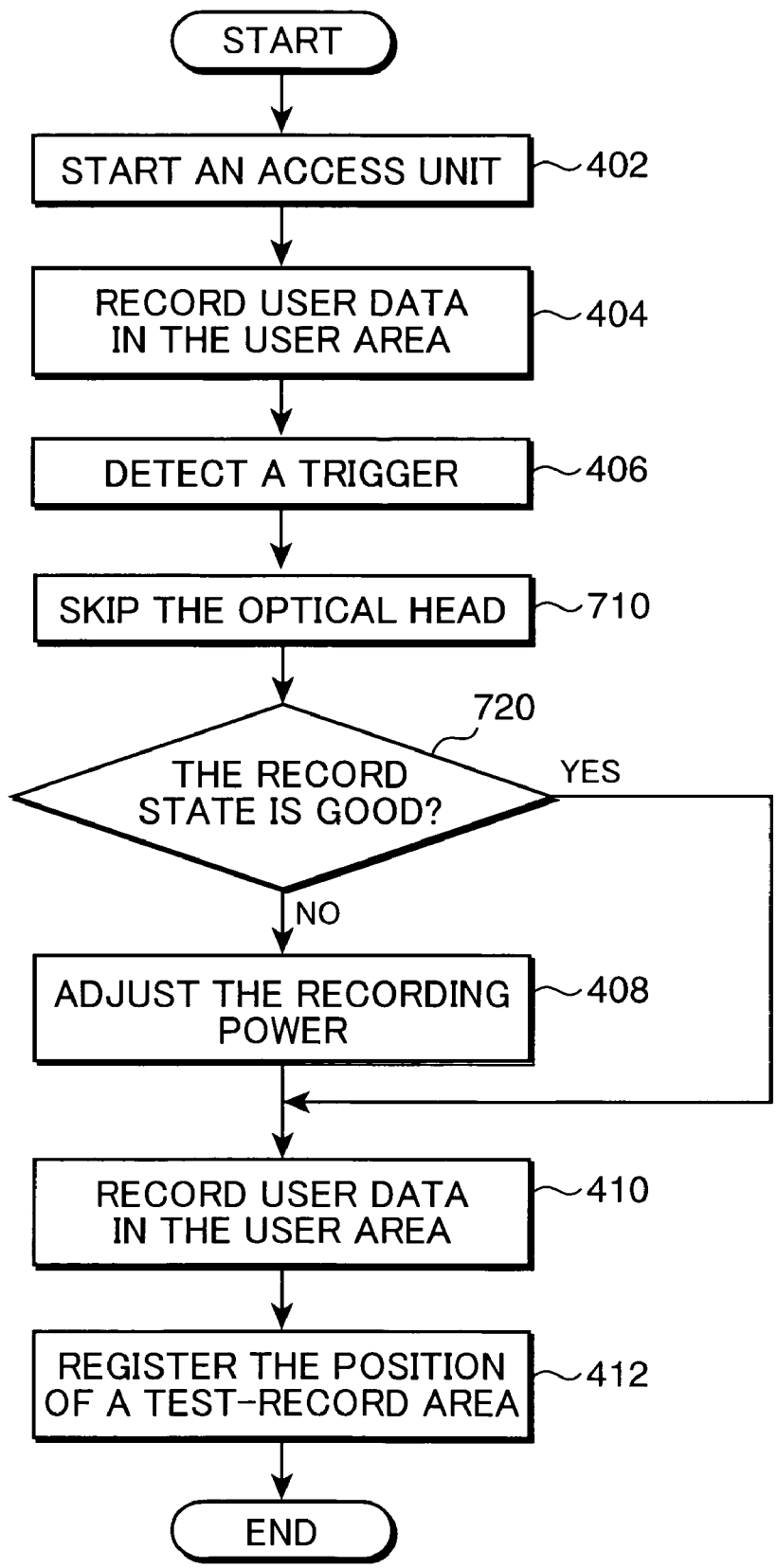
FIG. 6 is a flow chart, showing another example of the procedure for an access processing according to the embodiment of the present invention.
Figure 7:
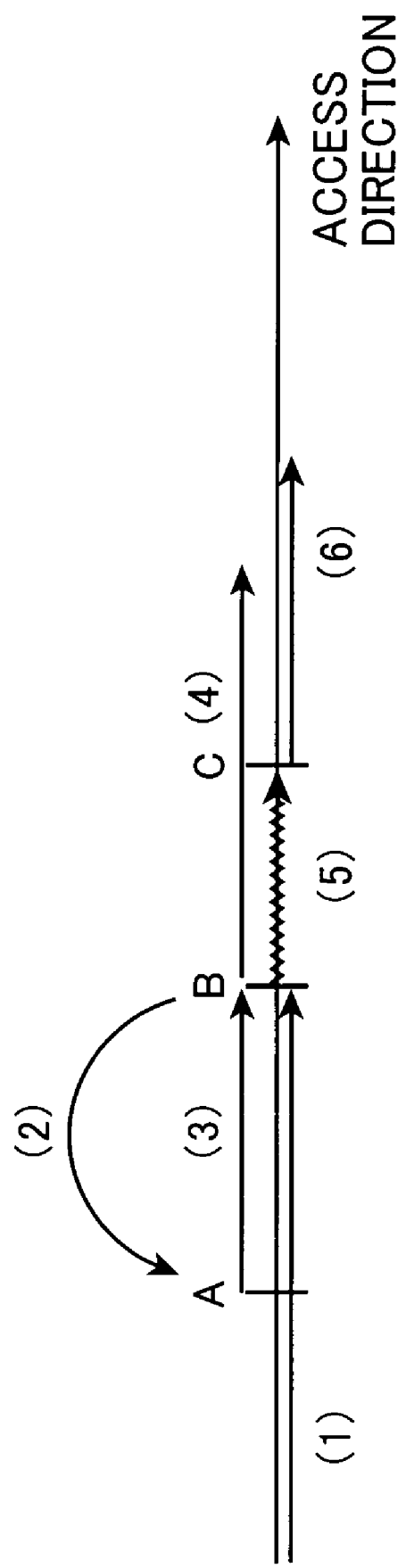
FIG. 7 is an illustration, showing the order of access in another example of the procedure for an access processing according to the embodiment of the present invention.

FIG. 6 is a flow chart, showing another example of the procedure for an access processing according to the embodiment of the present invention described with reference to FIG. 3. FIG. 7 is an illustration, showing the order of access in another example of the access-processing procedure shown in FIG. 6.

Hereinafter, with reference to FIG. 1, FIG. 2 and FIG. 6 and FIG. 7, another example of the access-processing procedure according to the embodiment of the present invention will be described step by step. In FIG. 6, its steps are given the same reference numerals as those of the steps shown in FIG. 3, and thus, their description is omitted.

Step 710: If the trigger detection circuit 116 detects a trigger (at a point B) while user data is recorded (an arrow (1)), the system control circuit 102 allows the optical head 106 to skip to a point A several tracks away from there on the inner-circumference side (an arrow (2)).

Step 720: According to an instruction given by the system control circuit 102, the regeneration-system circuit section 130 reads the user data recorded from the point A to the point B (an arrow (3)). Then, the system control circuit 102 decides whether the record state of the user data recorded from the point A to the point B is good or not.

The detection circuit section 140 detects the record state of the user data. Specifically, the detection circuit section 140 detects a signal evaluation index for deciding whether the record state of the read user data is good or not. According to whether the asymmetry value detected by the asymmetry detection circuit 111 is a desirable value or not, the system control circuit 102 decides whether the record state of the read user data is good or not. In other words, the system control circuit 102 decides whether the asymmetry value detected by the asymmetry detection circuit 111 is within a predetermined range or not. If it decides that the asymmetry value is within the predetermined range, the system control circuit 102 decides that the record state is good. On the other hand, if it decides that the asymmetry value is out of the predetermined range, the system control circuit 102 decides that the record state is not good.

Moreover, according to whether the jitter value detected by the jitter detection circuit 112 is a desirable value or not, the system control circuit 102 decides whether the record state of the read user data is good or not. In other words, the system control circuit 102 decides whether or not the jitter value detected by the jitter detection circuit 112 is equal to, or below, a predetermined value. If it decides that the jitter value is equal to, or below, the predetermined value, the system control circuit 102 decides that the record state is good. On the other hand, if it decides that the jitter value is above the predetermined value, the system control circuit 102 decides that the record state is not good.

In addition, according to whether the M-index detected by the M-index detection circuit 113 is a desirable value or not, the system control circuit 102 decides whether the record state of the read user data is good or not. In other words, the system control circuit 102 decides whether or not the M-index detected by the M-index detection circuit 113 is equal to, or below, a predetermined value. If it decides that the M-index is equal to, or below, the predetermined value, the system control circuit 102 decides that the record state is good. On the other hand, if it decides that the M-index is above the predetermined value, the system control circuit 102 decides that the record state is not good.

Still further, according to whether the error rate detected by the BER detection circuit 114 is a desirable value or not, the system control circuit 102 decides whether the record state of the read user data is good or not. In other words, the system control circuit 102 decides whether or not the error rate detected by the BER detection circuit 114 is equal to, or below, a predetermined value. If it decides that the error rate is equal to, or below, the predetermined value, the system control circuit 102 decides that the record state is good. On the other hand, if it decides that the error rate is above the predetermined value, the system control circuit 102 decides that the record state is not good.

Still further, according to whether the modulation factor detected by the modulation-factor detection circuit 118 is a desirable value or not, the system control circuit 102 decides whether the record state of the read user data is good or not. In other words, the system control circuit 102 decides whether or not the modulation factor detected by the modulation-factor detection circuit 118 is equal to, or below, a predetermined value. If it decides that the modulation factor is equal to, or below, the predetermined value, the system control circuit 102 decides that the record state is good. On the other hand, if it decides that the modulation factor is above the predetermined value, the system control circuit 102 decides that the record state is not good.

If the decision is made that the record state is good (YES at the step 720), the processing goes to the step 410. Then, the recording-system circuit section 120 records user data consecutively from the point B (an arrow (4)).

On the other hand, if the decision is made that the record state is not good (NO at the step 720), the processing goes to the step 408. Then, the system control circuit 102 adjusts the recording power (an arrow (5)). Using the adjusted recording power, the recording-system circuit section 120 records user data continuously from the point C (an arrow (6)).

In the example described with reference to FIG. 6 and FIG. 7, a decision is made whether or not the access parameter needs adjusting. Therefore, if the decision is made that the access parameter needs no adjusting, that helps avoid spending time on an unnecessary adjustment. Besides, the unnecessary access-parameter adjustment is not made, so that the number of times at which a test-record area is registered as a defective area can be reduced. This helps prevent the defective area from being unnecessarily increased.

So far, the embodiment of the present invention has been described with reference to FIG. 1 to FIG. 7.

For example, each component element described in the embodiment shown in FIG. 2 may be realized, using hardware, software, or hardware and software. Whichever may be used, hardware, software, or both, any procedure is available, as long as the access-processing procedure according to the present invention can be executed.

For example, in the access unit 100 according to the present invention, an access-processing program is stored for executing an access processing. When the access unit 100 is shipped, the access-processing program may be stored beforehand in the storage section 117 included in the access unit 100. Or, after the access unit 100 is shipped, the storage section 117 may also store the access-processing program. For example, a user may download the access-processing program with or without charge from a specific web site on the Internet. Then, the downloaded program is installed in the access unit 100. In the case where the access-processing program is recorded in a computer-readable record medium, such as a flexible disk, a CD-ROM and a DVD-ROM, using an input unit (e.g. a disk drive), the access-processing program may also be installed in the access unit 100. The installed access-processing program is stores, for example, in the storage section 117.

As described so far, the present invention has been illustrated using the preferred embodiment of the present invention. However, the present invention should not be interpreted as the one which is limited to this embodiment. It is understood that the scope of the present invention should be interpreted only by the claims. It is understood that those skilled in the art can implement an equivalent scope on the basis of the description of the present invention and ordinary skills in the art from the description of the specific preferred embodiment of the present invention. It is understood that the contents of the patent document cited herein should be cited as a reference for this specification in the same way as the fact that its contents themselves are specifically described herein.

Herein, the specific embodiment described so far mainly includes an invention which has the following configurations.

The access unit according to the present invention which accesses a record medium, the record medium including a user area for recording user data which is recorded and regenerated based on an instruction given by a user, comprising: a recording section for recording test data based on a predetermined test condition in the user area; a reading section for reading the test data recorded in the user area by the recording section; and an adjusting section for referring to the test data read by the reading section, and adjusting an access parameter for accessing the record medium.

According to this configuration, the record medium includes a user area for recording user data which can be recorded and regenerated based on an instruction given by a user. Then, test data based on a predetermined test condition is recorded in the user area, and the test data recorded in the user area is read. Sequentially, by referring to the read test data, an access parameter for accessing the record medium is adjusted.

Therefore, the access parameter can be adjusted without recording and regenerating test data in a read-in area allocated to the inner-circumference side from a user area or a read-out area allocated to the outer-circumference side from the user area. This makes it possible to shorten the seek time of an optical head to record and regenerate the test data.

Furthermore, in the above described access unit, a detecting section may be further provided for detecting a trigger for starting an adjustment of the access parameter. If this detecting section detects a trigger, the recording section records test data based on a predetermined test condition in the user area. In this case, an adjustment of the access parameter can be started by detecting a predetermined trigger.

Moreover, in the above described access unit, the detecting section may also detect the trigger based on a change in the temperature of the access unit. In this case, an adjustment of the access parameter can be started, using the access unit's temperature change as a trigger.

In addition, in the above described access unit, a user-data recording section may be further provided for recording user data in the user area. On the basis of the position of user data recorded by this user-data recording section, the detecting section detects the trigger. In this case, an adjustment of the access parameter can be started, using the user-data record position as a trigger.

Furthermore, in the above described access unit, the detecting section may also detect the trigger if a write command issued by an external unit is inputted. In this case, an adjustment of the access parameter can be started, using the write command issued by an external unit as a trigger.

Moreover, in the above described access unit, a user-data recording section may be further provided for executing an operation for recording user data in the user area. On the basis of the operation time of this user-data recording section, the detecting section detects the trigger. In this case, an adjustment of the access parameter can be started, using the operation time to record user data as a trigger.

In addition, in the above described access unit, it is preferable that a registering section be further provided for registering a test-record area in which the test data is recorded within the user area. According to this configuration, a test-record area in which the test data is recorded within the user area is registered, thus helping manage the test-record area.

Furthermore, in the above described access unit, preferably, the registering section should register the test-record area as a defective area. According to this configuration, the test-record area is registered as a defective area. Thereby, user data can be continuously regenerated without executing a regeneration in the test-record area where the test data is recorded.

Moreover, in the above described access unit, it is preferable that the recording section record the test data in a position which is a predetermined distance apart in the radius directions of the record medium from a position in which user data is recorded within the user area.

According to this configuration, the test data is recorded in a position which is a predetermined distance apart in the radius directions of the record medium from a position in which user data is recorded within the user area. Therefore, even if the servomechanism has trouble, which causes a shift in the test-data record position, then the user data already recorded can be prevented from being destroyed.

In addition, in the above described access unit, preferably, the recording section should begin recording the test data from a position which is a predetermined distance apart in the radius directions of the record medium from a position in which user data finishes being recorded within the user area, and should begin recording user data from a position which is a predetermined distance apart in the radius directions of the record medium from a position in which the test data finishes being recorded.

According to this configuration, a recording of the test data starts from a position which is a predetermined distance apart in the radius directions of the record medium from a position in which user data finishes being recorded within the user area. Then, a recording of user data starts from a position which is a predetermined distance apart in the radius directions of the record medium from a position in which the test data finishes being recorded. Therefore, even if the servomechanism has trouble, which causes a shift in the test-data record position, then the user data already recorded can be prevented from being destroyed. Besides, even if the user-data record position is shifted, the next user data can be recorded without accessing the test-record area where the test data is recorded.

Furthermore, in the above described access unit, it is preferable that a registering section be further provided for registering, as a defective area, a test-record area in which the test data is recorded within the user area, an area from a position in which user data finishes being recorded to a position in which the test data begins being recorded, and an area from a position in which the test data finishes being recorded to a position in which user data begins being recorded.

According to this configuration, a test-record area in which the test data is recorded within the user area, an area from a position in which user data finishes being recorded to a position in which the test data begins being recorded, and an area from a position in which the test data finishes being recorded to a position in which user data begins being recorded, are registered as a defective area. Therefore, user data can be continuously regenerated, without executing a regeneration in the test-record area in which the test data is recorded, the area from a position in which user data finishes being recorded to a position in which the test data begins being recorded and the area from a position in which the test data finishes being recorded to a position in which user data begins being recorded.

Moreover, in the above described access unit, preferably, the recording section should: begin recording the test data from a position which is a predetermined distance apart in the radius directions of the record medium from a position in which user data finishes being recorded within the user area; execute a return from a position in which the test data finishes being recorded to the position in which the user data finishes being recorded; record user data up to the position in which the test data begins being recorded; execute a movement from the position in which the test data begins being recorded to the position in which the test data finishes being recorded; and begin recording user data from the position in which the test data finishes being recorded.

According to this configuration, in the user area, a recording of the test data starts from a position which is a predetermined distance apart in the radius directions of the record medium from a position in which user data finishes being recorded. Then, a return is executed from a position in which the test data finishes being recorded to the position in which the user data finishes being recorded. Next, user data is recorded up to the position in which the test data begins being recorded. Sequentially, a movement is executed from the position in which the test data begins being recorded to the position in which the test data finishes being recorded. Finally, a recording of user data starts from the position in which the test data finishes being recorded. Therefore, user data can be recorded in areas other than the test-record area in which the test data is recorded. This makes it possible to use the user area so that it cannot run to waste.

In addition, in the above described access unit, it is preferable that the recording section: begin recording the test data from a position which is a predetermined distance apart in the radius directions of the record medium from a position in which user data finishes being recorded within the user area; execute a return from a position in which the test data finishes being recorded to the position in which the user data finishes being recorded; and begin recording user data from the position in which the user data finishes being recorded.

According to this configuration, in the user area, a recording of the test data starts from a position which is a predetermined distance apart in the radius directions of the record medium from a position in which user data finishes being recorded. Then, a return is executed from a position in which the test data finishes being recorded to the position in which the user data finishes being recorded. Sequentially, a recording of user data starts from the position in which the user data finishes being recorded. Therefore, user data is overwritten in areas other than the test-record area in which the test data is recorded. This makes it possible to make good use of the user area.

Furthermore, in the above described access unit, preferably, the reading section should read user data which is already recorded in the user area; a record-state detecting section should be further provided for detecting a record state of the user data read by the reading section; and the recording section should record the test data in the user area, based on a record state which is detected by the record-state detecting section.

According to this configuration, user data already recorded in the user area is read, and the record state of the read user data is detected. Then, based on the detected record state, the test data is recorded in the user area. Therefore, a decision is made according to the record state of the user data whether or not the test data should be recorded. This helps prevent the test data from being unnecessarily recorded.

Moreover, in the above described access unit, it is preferable that the record-state detecting section detect at least one of a jitter value, an asymmetry value, an error rate and an M-index of the user data read by the reading section.

According to this configuration, at least one record state of a user data's jitter value, an asymmetry value, an error rate and an M-index is detected. On the basis of the detected record state, the test data is recorded in the user area. Therefore, according to at least one of the user data's jitter value, asymmetry value, error rate and M-index, a decision is made whether or not the test data should be recorded. This helps prevent the test data from being unnecessarily recorded.

In addition, in the above described access unit, preferably, the recording section should record the test data in a track adjacent to the user data. According to this configuration, the test data is recorded in a track adjacent to the user data. Therefore, the user area can be used less wastefully than the case where the test data is recorded in a position a predetermined distance apart from the user-data record position.

The access method according to the present invention for accessing a record medium, the record medium including a user area for recording user data which is recorded and regenerated based on an instruction given by a user, including: a recording step of recording test data based on a predetermined test condition in the user area; a reading step of reading the test data recorded in the user area in the recording step; and an adjusting step of referring to the test data read in the reading step, and adjusting an access parameter for accessing the record medium.

According to this configuration, the record medium includes a user area for recording user data which can be recorded and regenerated based on an instruction given by a user. Then, test data based on a predetermined test condition is recorded in the user area, and the test data recorded in the user area is read. Sequentially, by referring to the read test data, an access parameter for accessing the record medium is adjusted.

Therefore, the access parameter can be adjusted without recording and regenerating test data in a read-in area allocated to the inner-circumference side from a user area or a read-out area allocated to the outer-circumference side from the user area. This makes it possible to shorten the seek time of an optical head to record and regenerate the test data.

The computer-readable recording medium recorded with the access program according to the present invention for accessing a record medium, the record medium including a user area for recording user data which is recorded and regenerated based on an instruction given by a user, allowing, an access unit which includes a recording section for recording data in a record medium and a reading section for reading data from a record medium, to function as: a record instructing section for instructing the recording section to record test data based on a predetermined test condition in the user area; a read instructing section for instructing the reading section to read the test data recorded in the user area by the recording section; and an adjusting section for referring to the test data read by the reading section, and adjusting an access parameter for accessing the record medium.

According to this configuration, the record medium includes a user area for recording user data which can be recorded and regenerated based on an instruction given by a user. Then, the recording section is instructed to record test data based on a predetermined test condition in the user area, and the reading section is instructed to read the test data recorded in the user area by the recording section. Sequentially, by referring to the test data read by the reading section, an access parameter for accessing the record medium is adjusted.

Therefore, the access parameter can be adjusted without recording and regenerating test data in a read-in area allocated to the inner-circumference side from a user area or a read-out area allocated to the outer-circumference side from the user area. This makes it possible to shorten the seek time of an optical head to record and regenerate the test data.

The control unit according to the present invention which controls an access unit, the access unit including a recording section for recording data in a record medium and a reading section for reading data from a record medium, the record medium including a user area for recording user data which is recorded and regenerated based on an instruction given by a user, comprising: a record instructing section for instructing the recording section to record test data based on a predetermined test condition in the user area; a read instructing section for instructing the reading section to read the test data recorded in the user area by the recording section; and an adjusting section for referring to the test data read by the reading section, and adjusting an access parameter for accessing the record medium.

According to this configuration, the record medium includes a user area for recording user data which can be recorded and regenerated based on an instruction given by a user. Then, the recording section is instructed to record test data based on a predetermined test condition in the user area, and the reading section is instructed to read the test data recorded in the user area by the recording section. Sequentially, by referring to the test data read by the reading section, an access parameter for accessing the record medium is adjusted.

Therefore, the access parameter can be adjusted without recording and regenerating test data in a read-in area allocated to the inner-circumference side from a user area or a read-out area allocated to the outer-circumference side from the user area. This makes it possible to shorten the seek time of an optical head to record and regenerate the test data.

INDUSTRIAL APPLICABILITY

The access unit, access method, access program and control unit according to the present invention are capable of shortening the seek time of an optical head to record and regenerate test data. They are useful as an access unit, an access method, an access program, a control unit and the like for accessing a record medium including a user area in which a user can record data.

The invention claimed is:

1. An access unit which accesses a record medium, the record medium including a user area for recording user data which is recorded and reproduced based on an instruction given by a user, the access unit comprising:
   a recording section for recording test data in the user area based on a predetermined test condition in the user area during recording of the user data in the user area;

a reading section for reading the test data recorded in the user area by the recording section; and an adjusting section for referring to the test data read by the reading section, and adjusting an access parameter for accessing the record medium, wherein the recording section is configured to begin recording the test data at a position which is a predetermined radial distance toward an outer circumference of the record medium from a first position in which a first portion of the user data finishes being recorded in the user area, and configured to begin recording a second portion of the user data in a second position which is a predetermined radial distance toward the outer circumference of the record medium from a position in which the test data finishes being recorded.

2. The access unit according to claim 1, further comprising a registering section for registering a test-record area in which the test data is recorded within the user area.

3. The access unit according to claim 2, wherein the registering section registers the test-record area as a defective area.

4. The access unit according to claim 1, further comprising a registering section for registering, as defective areas, a test-record area in which the test data is recorded within the user area, an area from a position in which user data finishes being recorded to a position in which the test data begins being recorded, and an area from a position in which the test data finishes being recorded to a position in which user data begins being recorded.

5. The access unit according to claim 1, wherein:
the reading section reads user data which is already recorded in the user area;
a record-state detecting section is further provided for detecting a record state of the user data read by the reading section; and
the recording section records the test data in the user area, based on a record state which is detected by the record-state detecting section.

6. The access unit according to claim 5, wherein the record-state detecting section detects at least one of a jitter value, an asymmetry value, an error rate and an M-index of the user data read by the reading section.

7. An access method for accessing a record medium, the record medium including a user area for recording user data which is recorded and reproduced based on an instruction given by a user, said access method comprising:
recording test data in the user area based on a predetermined test condition in the user area during recording of the user data in the user area, the recording the test data beginning in a position which is a predetermined radial distance toward an outer circumference of the record medium from a first position in which a first portion of the user data finishes being recorded in the user area;
reading the test data recorded in the user area in the recording operation;
referring to the test data read in the reading operation, and adjusting an access parameter for accessing the record medium; and
recording a second portion of the user data beginning in a second position which is a predetermined radial distance toward the outer circumference of the record medium from a position in which the test data finishes being recorded.

8. An access unit which includes a recording section for recording data in a record medium that includes a user area for recording user data which is recorded and reproduced based on an instruction given by a user, a reading section for reading data from the record medium, and a computer-readable recording medium having recorded thereon an access program for causing the access unit to execute at least the following:
instructing the recording section to record test data in the user area based on a predetermined test condition in the user area during recording of the user data in the user area, the recording the test data beginning in a position which is a predetermined radial distance toward an outer circumference of the record medium from a first position in which a first portion of the user data finishes being recorded in the user area;
instructing the reading section to read the test data recorded in the user area by the recording section;
referring to the test data read by the reading section, and adjusting an access parameter for accessing the record medium; and
recording a second portion of the user data beginning in a second position which is a predetermined radial distance toward the outer circumference of the record medium from a position in which the test data finishes being recorded.

9. A control unit which controls an access unit, the access unit including a recording section for recording data in a record medium and a reading section for reading data from a record medium, the record medium including a user area for recording user data which is recorded and reproduced based on an instruction given by a user, the control unit comprising:
a record instructing section for instructing the recording section to record test data in the user area based on a predetermined test condition in the user area during recording of the user data in the user area;
a read instructing section for instructing the reading section to read the test data recorded in the user area by the recording section; and
an adjusting section for referring to the test data read by the reading section, and adjusting an access parameter for accessing the record medium,
wherein the record instructing section is configured to instruct the recording section to begin recording the test data at a position which is a predetermined radial distance toward an outer circumference of the record medium from a first position in which a first portion of the user data finishes being recorded in the user area, and configured to instruct the recording section to begin recording a second portion of the user data in a second position which is a predetermined radial distance toward the outer circumference of the record medium from a position in which the test data finishes being recorded.

10. An access unit which accesses a record medium, the record medium including a user area for recording user data which is recorded and reproduced based on an instruction given by a user, the access unit comprising:
a recording section for recording test data in the user area based on a predetermined test condition in the user area during recording of the user data in the user area;
a reading section for referring to the test data recorded in the user area by the recording section; and
an adjusting section for referring to the test data read by the test data read by the reading section, and adjusting an access parameter for accessing the record medium,
wherein the recording section is configured to:
begin recording the test data at a position which is a predetermined radial distance toward an outer circumference of the record medium from a first position in which a first portion of the user data finishes being recorded in the user area;

execute a return from a position in which the test data finishes being recorded to the position in which the first portion of the user data finished being recorded, and record user data up to the position in which the test data began being recorded; and execute a movement from the position in which the test data began being recorded to the position in which the test data finished being recorded, and begin recording of a second portion of the user data from the position in which the test data finished being recorded, whereby the user data is recorded in the user area other than a test record area in which the test data has been recorded.

11. An access method for accessing a record medium, the record medium including a user area for recording user data which is recorded and reproduced based on an instruction given by a user, the access method comprising:

recording test data in the user area based on a predetermined test condition in the user area during recording of the user data in the user area, the recording the test data beginning in a position which is a predetermined radial distance toward an outer circumference of the record medium from a first position in which a first portion of the user data finishes being recorded in the user area;

reading the test data recorded in the user area;

referring to the read test data, and adjusting an access parameter for accessing the record medium;

executing a return from a position in which the test data finishes being recorded to the position in which the first portion of the user data finished being recorded and recording user data up to the position in which the test data began being recorded; and executing a movement from the position in which the test data began being recorded to the position in which the test data finished being recorded and recording a second portion of the user data from the position in which the test data finished being recorded, whereby the user data is recorded in the user area other than a test record area in which the test data has been recorded.

12. An access unit which includes a recording section for recording data in a record medium that includes a user area for recording user data which is recorded and reproduced based on an instruction given by a user, a reading section for reading data from the record medium, and a computer-readable recording medium having recorded thereon an access program for causing the access unit to execute at least the following:

instructing the recording section to record test data in the user area based on a predetermined test condition in the user area during recording of the user data in the user area, the recording of the test data beginning in a position which is a predetermined radial distance toward an outer circumference of the record medium from a first position in which a first portion of the user data finishes being recorded in the user area;

instructing the reading section to read the test data recorded in the user area by the recording section;

referring to the test data read by the reading section, and adjusting an access parameter for accessing the record medium;

instructing the recording section to execute a return from a position in which the test data finishes being recorded to the position in which the first portion of the user data finished being recorded and recording user data up to the position in which the test data began being recorded; and instructing the recording section to execute a movement from the position in which the test data began being recorded to the position in which the test data finished being recorded and recording a second portion of the user data from the position in which the test data finished being recorded, whereby the user data is recorded in the user area other than a test record area in which the test data has been recorded.

13. A control unit which controls an access unit, the access unit including a recording section for recording data in a record medium and a reading section for reading data from a record medium, the record medium including a user area for recording user data which is recorded and reproduced based on an instruction given by a user, the control unit comprising:

a record instructing section for instructing the recording section to record test data in the user area based on a predetermined test condition in the user area during recording of the user data;

a read instructing section for instructing the reading section to read the test data recorded in the user area by the recording section;

an adjusting section for referring to the test data read by the reading section, and adjusting an access parameter for accessing the record medium, wherein the record instructing section instructs the recording section to begin recording the test data from a position which is a predetermined radial distance toward an outer circumference of the record medium from a first position in which a first portion of the user data finishes being recorded in the user area, to execute a return from a position in which the test data finishes being recorded to the position in which the first portion of the user data finished being recorded, and record user data up to the position in which the test data began being recorded, and to execute a movement from the position in which the test data began being recorded to the position in which the test data finished being recorded, and begin recording of a second portion of the user data from the position in which the test data finished being recorded, whereby the user data is recorded in the user area other than a test record area in which the test data has been recorded.

* * * * *